United States Patent [19]

Ito

[11] Patent Number: 4,773,056
[45] Date of Patent: Sep. 20, 1988

[54] DISC ACCOMMODATION TRAY AND DISC PLAYER EMPLOYING SAID DISC ACCOMMODATION TRAY

[75] Inventor: Masashi Ito, Settsu, Japan

[73] Assignee: Matsushita Electric Industrial Co., Osaka, Japan

[21] Appl. No.: 83,950

[22] Filed: Aug. 10, 1987

Related U.S. Application Data

[63] Continuation of Ser. No. 756,379, Jul. 18, 1985, abandoned.

[30] Foreign Application Priority Data

Jul. 23, 1984 [JP] Japan ................................ 59-152443
Jul. 23, 1984 [JP] Japan ................................ 59-152445

[51] Int. Cl.⁴ .......................................... G11B 17/022
[52] U.S. Cl. .................................. 369/75.2; 369/77.1
[58] Field of Search ................ 369/77.2, 291, 292, 369/75.1, 75.2; 206/455, 312; 360/133

[56] References Cited

U.S. PATENT DOCUMENTS

| | | | |
|---|---|---|---|
| 4,148,491 | 4/1979 | Stark et al. .......................... 369/289 |
| 4,433,410 | 2/1984 | Siryj et al. .......................... 369/77.2 |
| 4,481,618 | 11/1984 | Nakayama .......................... 369/75.2 |
| 4,519,060 | 5/1985 | Ycas .................................... 369/77.2 |
| 4,592,039 | 5/1986 | Toyoguchi et al. ................ 369/77.2 |
| 4,617,655 | 10/1986 | Aldenhoven ....................... 369/291 |

FOREIGN PATENT DOCUMENTS

| | | | |
|---|---|---|---|
| 129292 | 12/1984 | European Pat. Off. . |
| 130636 | 1/1985 | European Pat. Off. . |
| 170957 | 2/1986 | European Pat. Off. ............ 369/291 |
| 3408751 | 9/1984 | Fed. Rep. of Germany . |
| 114366 | 7/1983 | Japan .................................. 206/312 |
| 5658167 | 5/1984 | Japan .................................. 369/75.2 |
| 2126003 | 3/1984 | United Kingdom . |

Primary Examiner—Steven L. Stephan
Attorney, Agent, or Firm—Wenderoth, Lind & Ponack

[57] ABSTRACT

A disc accommodation tray (T) and a disc player (P) employing such a tray for an optical disc system, etc. employing circular discs (1) are provided. The accommodation tray had (T), at least one engaging or retaining portion (9, 10, 11, 12) elastically clamping the disc (1), and a hole or opening (13, 14) through which a turntable (17) is inserted. Thus, it is possible to mount the tray (T) onto the disc player (P), with the disc (1) accommodated in the tray (T), and to dismount the tray (T) from the disc player (P), with the disc (1) accommodated in the tray (T).

7 Claims, 6 Drawing Sheets

DISC ACCOMMODATION TRAY AND DISC PLAYER EMPLOYING SAID DISC ACCOMMODATION TRAY

This application is a continuation, of now abandoned application Ser. No. 756,379, filed July 18, 1985 now abaondoned.

BACKGROUND OF THE INVENTION

The present invention generally relates to a signal reproducing arrangement and more particularly, to a disc storing or accommodation tray used, for example, in an optical disc system, etc. which employs a recording medium in the form of a disc having, in its information tracks, recorded digital signals in a high density therein, and to a disc reproducing apparatus or disc player (referred to as a disc player hereinbelow) employing such a disc accommodation tray.

Generally, a disc accommodation tray of the above type is employed for video discs on which video signals are recorded, digital audio discs recorded with coded audio signals, and high density information recording and reproduction discs used in the fields related to computers, etc.

In such disc systems, coded video signals, audio signals, and various information are preliminarily recorded on discs in the form of information tracks, and while the disc is being rotated at high speeds, light rays emitted from a light source such as a laser light source, etc. are converged onto the information tracks on the disc for reading the reflected light from the disc surface, so as to reproduce the originally recorded information.

Such an optical system information reading apparatus is capable of reading extremely dense recorded information, thus making it possible to effect recording at high density, high accuracy and high performance as compared with the conventional apparatuses of the analog system.

However, these discs recorded with information at high density as described above are made of resin materials such as acrylic resin, polycarbonate resin, etc., and are considered to deteriorate extremely in performance or become incapable of reproduction, if flaws or scratches are formed or fingerprints are left on the disc surface, and therefore, disc accommodation trays are required in order to protect the discs against any damage or soiling.

Hereinbelow, a conventional accommodation tray will be described with reference to a compact disc taken up as an example.

Figure 1:
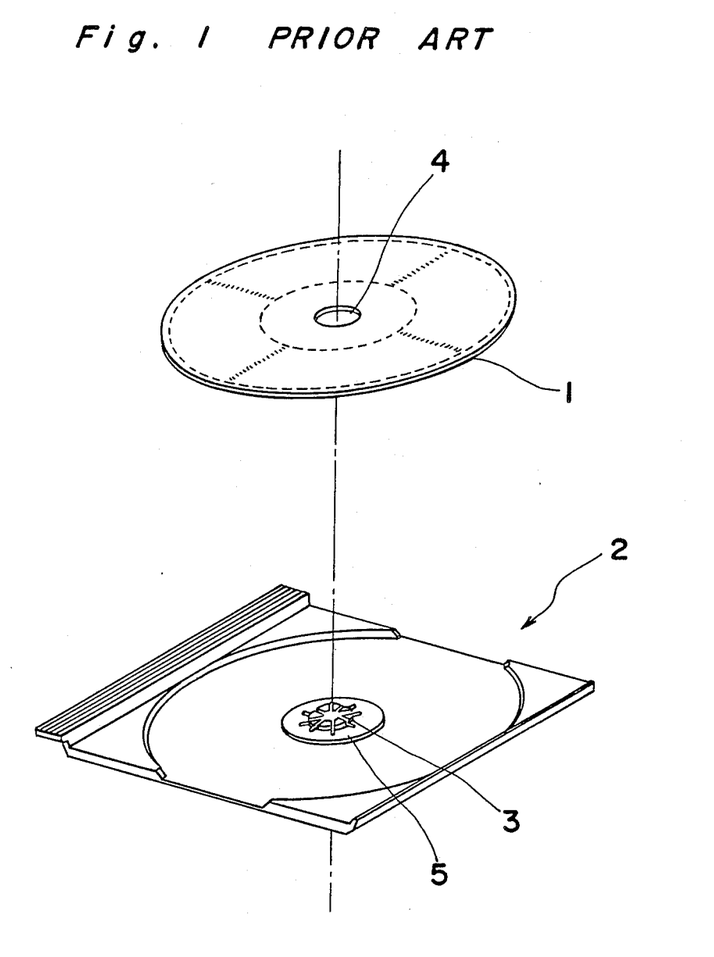
FIG. 1 is a perspective view showing a conventional disc accommodation tray together with a disc to be accommodated therein (already referred to)

In FIG. 1, there is shown a conventional accommodation tray 2 together with a disc 1. The disc 1 with dimensions of 120 mm in diameter, 15 mm in a central opening diameter, and 1.2 mm in thickness may be accommodated in the tray 2 by forcing its central opening 4 onto an engaging portion 3 being resilient and being provided generally at a central portion of the tray 2 molded from a resin material. At a portion around the outer peripheral edge of the engaging portion 3, there is formed a circular convex portion 5 for slightly raising the disc 1 so that the surface of the disc 1 may not directly contact the corresponding surface of the accommodation tray 2.

In the conventional arrangement as described above, however, in the case where the disc 1 is to be mounted on the accommodation tray 2, it is necessary to depress a portion of the disc in the vicinity of its central portion by fingers, while on the other hand, for dismounting the disc 1 from the tray 2, only the outer peripheral portion of the disc 1 is normally lifted, but in this case since the detaching becomes difficult due to warping at the peripheral portion of the disc 1, it is necessary, in the actual practice, to detach the disc 1 while reducing the resiliency or spring force with respect to the central opening 4 of the disc 1 through depression at the central portion of the engaging portion 3 of the tray 2 by finger tips, thus requiring troublesome procedures for the attaching and detaching operations of the disc 1. Furthermore, there has been such a problem that the conventional accommodation tray is intended only to store the disc without any damage thereto, and is not suitable for applicatin to a disc player for reproduction of the disc, with the disc being accommodated in the tray as it is.

SUMMARY OF THE INVENTION

Accordingly, an essential object of the present invention is to provide an improved disc accommodation tray in which attaching and detaching of a disc thereto is facilitated, and which is capable of being mounted onto a disc player without requiring the disc to be touched by fingers, i.e., capable of being mounted onto a disc player, with the disc accommodated therein, and also, being dismounted from the disc player, with the disc accommodated therein upon completion of reproduction of the disc.

Another important object of the present invention is to provide a disc player to which the disc accommodation tray of the above described type may be readily applied.

In accomplishing these and other ojbects, according to one preferred embodiment of the present invention, there is provided a disc accommodation tray which includes a flat main body, a recess formed in the flat main body for receiving a disc therein, and at least one engaging portion having resilient and being provided at a peripheral edge portion of said recess for depressing the outer peripheral portion of the disc accommodated in said recess, toward its central portion.

More specifically, according to the present invention, it is so arranged that the recess in which the disc can be accommodated and at least one engaging portion for resiliently clamping the disc in its diametrical direction are provided in the accommodation tray for facilitating attaching and detaching of the disc with respect to said tray, while a hole or opening through which a turntable may be inserted is also provided in the accommodation tray, whereby it is possible to apply the tray itself onto a disc player, with the disc accommodated in said tray for reproduction in a state where the disc is separated from said tray, and after the reproduction, to withdraw the accommodation tray, with the disc contained therein as in the original state.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 2:
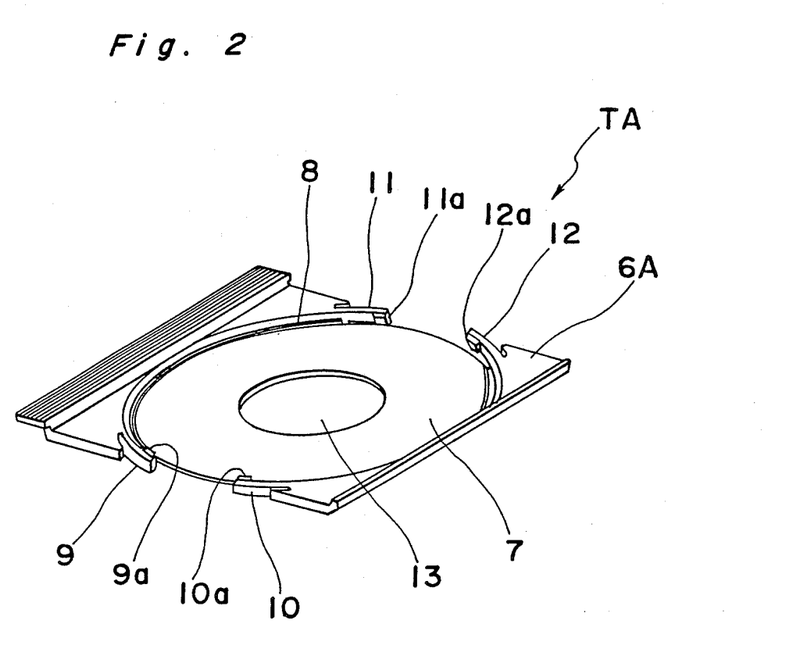
FIG. 2 is a perspective view showing an improved disc accommodation tray according to one preferred embodiment of the present invention.

Referring now to the drawings, there is shown in FIG. 2 a disc accommodation tray TA according to one preferred embodiment of the present invention, which generally includes a flat main body 6A molded from a resin material, a recess 7 formed in the main body 6A and having a diameter generally equal to that of the disc 1 for receiving said disc therein, an annular protrusion 8 formed only at the outer peripheral portion of the recess 7 corresponding to the outermost peripheral portion of the disc 1 where no signals are reduced on said disc so as to provide a low stepped portion for preventing the disc surface from contacting the confronting surface of the recess 7, and for example, four engaging portions 9, 10, 11 and 12 each having resiliency and provided at positions symmetrical to each other in the direction of the disc surface for depressing the outer peripheral edge of said disc toward its central portion, with an opening 13 being further formed at a central portion of the recess 7 as shown.

At forward ends of the respective engaging portions 9, 10, 11 and 12, there are formed claws 9a, 10a, 11a and 12a having angles of inclination opposite to each other so that during mounting, the disc 1 is forced into the recess 7 while depressing the engaging portions 9 to 12 for expansion along the inclined portions thereof, and in the state where the disc 1 has gone over predetermined inclined portions, said disc 1 may be perfectly clamped by the engaging portions 9 through 12.

By the above construction, since the portion between the engaging portions 9 and 10 and the portion between the engaging portions 11 and 12, are separately formed at positions on the main body 6A symmetrical to each other, the disc 1 may be readily attached or detached with respect to the tray TA by merely holding the outer peripheral portion of said disc 1 and lowering or lifting, with one finger being inserted between the engaging portions 9 and 10 and between the engaging portions 11 and 12 respectively, and thus, mounting and dismounting of the disc 1 with respect to the accommodation tray TA itself can be effected extremely easily. For this purpose, the diameter of the recess 7 of the tray TA at the peripheral portions between the engaging portions 9 and 10, and 11 and 12, should preferably be set smaller than the outermost diameter of the disc 1, and these peripheral portions are also utilized for facilitating automatic (mechanical) pushing down or pushing up the disc 1 so as to attach or detach the disc 1 with respect to the accommodation tray TA in the case where the tray TA is inserted into a disc player PA (FIG. 3), with the disc 1 accommodated therein.

Figure 3:
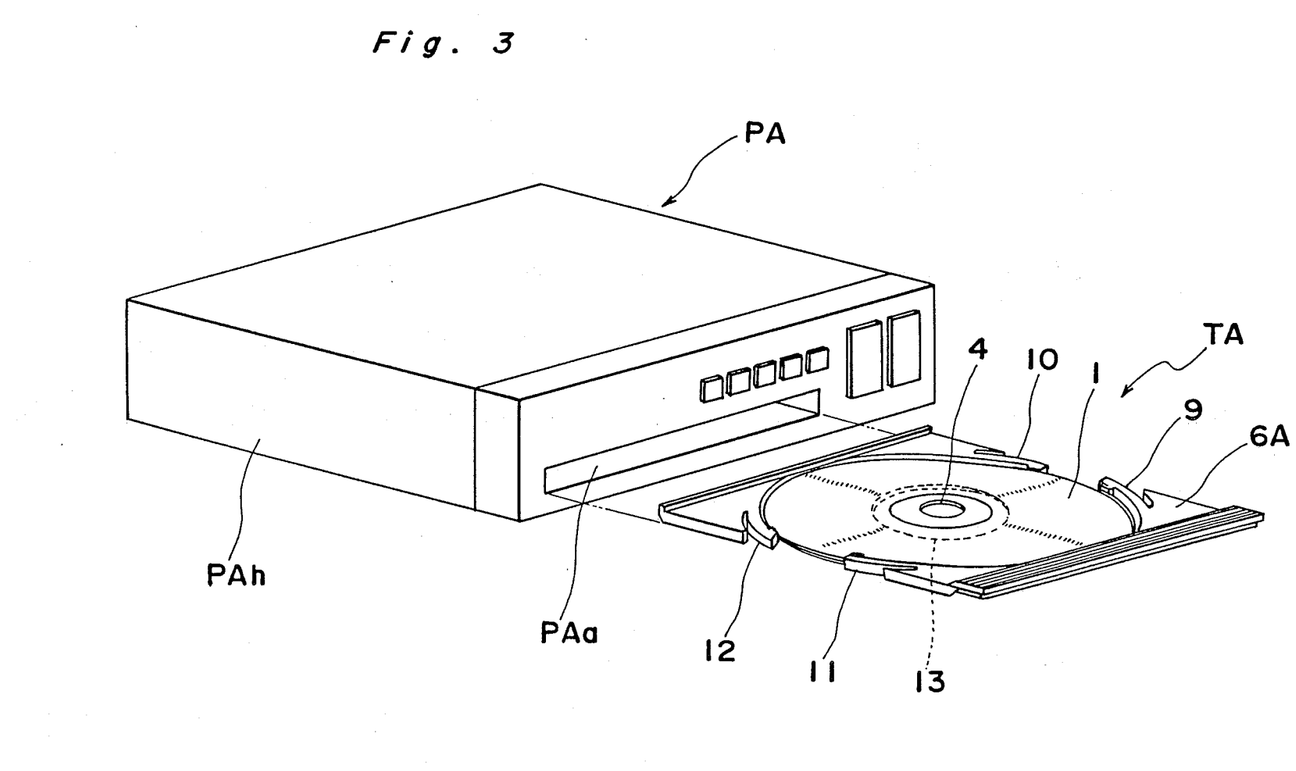
FIG. 3 is a view similar to FIG. 2, which particularly shows a state of use of the tray of FIG. 2 together with a disc player.

Although the opening 13 formed generally at a central portion of the recess 7 in the tray TA is not particularly necessary for the purpose of accommodating the disc 1 therein, such an opening is to be utilized for facilitating direct clamping of the disc 1 therethrough by a turntable and a disc presser (not shown here) for rotation of said disc, when the accommodation tray TA is mounted on the disc player PA, with the disc 1 being accommodated in said tray (FIG. 3).

More specifically, in the above case, an optical pick-up (not shown) for reproducing the disc 1 is disposed in the disc player PA on a plane above the upper surface of the tray TA as inserted in the disc player PA (i.e., a plane confronting the surface of the disc 1), and the disc 1 is raised from the recess 7 of the tray TA by the turntable and the disc presser against the resiliency of the engaging portions 9 to 12 and in clamped thereby and directly rotated by the turntable. Following the above rotation of the disc 1, the information contained in the disc 1 is reproduced by the optical pick-up.

FIG. 3 shows one example of the disc player PA referred to above, in which the accommodation tray TA having the disc 1 accommodated therein, is inserted into a housing PAh of the player PA through an insertion port or slot PAa provided at one side of the housing PAh for the reproduction of the disc 1 in the manner as described above.

Figure 4:
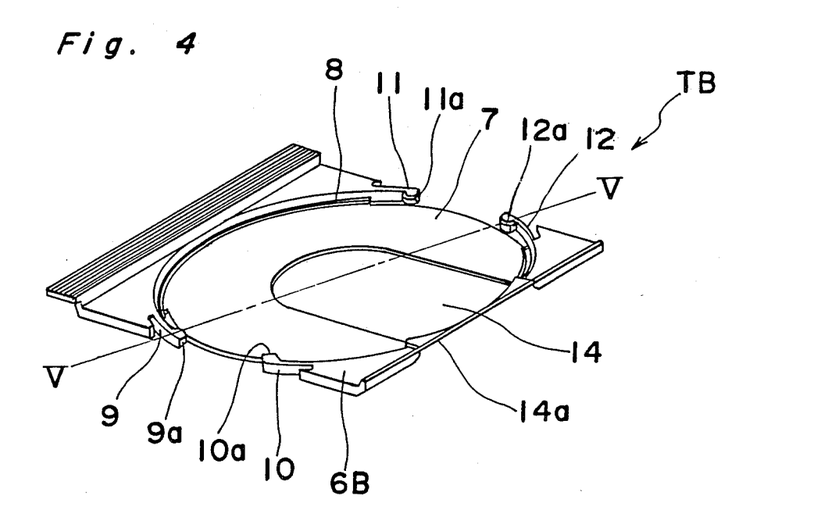
FIG. 4 is a perspective view showing a disc accommodation tray according to another embodiment of the present invention.
Figure 5:
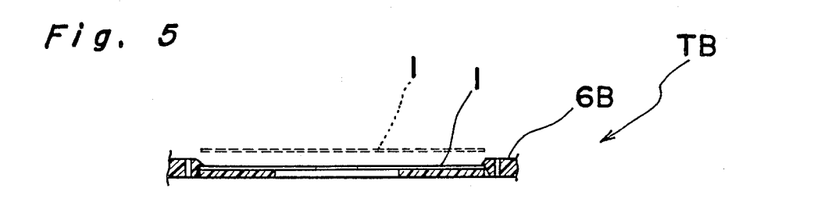
FIG. 5 is a fragmentary side sectional view of the tray of FIG. 4 for explaining a clamping function thereof.
Figure 6:
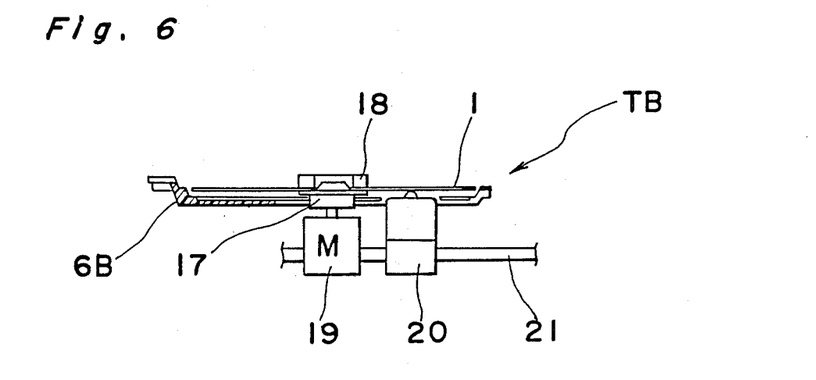
FIG. 6 is a view similar to FIG. 5, particularly showing the tray of FIG. 4 in a reproducing state together with essential portions of a disc player.

Referring to FIGS. 4 through 6, there is shown a modification of the accommodation tray TA of FIGS. 2 and 3.

The modified accommodation tray TB in FIGS. 4 to 6 is related to a case where the disc 1 is accommodated in said tray with the signal-recorded surface thereof reversed from that in the embodiment of FIGS. 2 and 3, and is markedly different from the tray TA in FIGS. 2 and 3 in that the central opening 13 of the tray TA is replaced by a cut-out portion 14 continuously formed in the recess 7 at its portions where the turntable is to be inserted and the optical pick-up pursues the disc 1 while approaching close thereto, except for a connecting portion 14a provided at one edge of the main body 6B.

FIG. 6 shows a cross section taken along the line V—V in FIG. 4, and the accommodated state of the disc 1 is represented by a solid line, while the clamped state thereof is shown by a dotted line. Since the functions of the engaging portions 9 to 12 in the case where the disc 1 is accommodated in the recess 7 of the tray TB are the same as those in the embodiment of FIGS. 2 and 3, description thereof is abbreviated here for brevity.

FIG. 6 shows the actual state of reproduction in the disc player PB (FIG. 7), in which the disc 1 is raised from the recess 7 of the tray TB, and clamped between the disc presser 18 and the turntable 17 which is rotated by a spindle motor 19. The optical pick-up 20 is displaced linearly along a shaft 21 within the cut-out portion 14 for the reproduction of the disc 1.

It is to be noted here that the connecting portion 14a provided at one edge of the main body 6B for connecting the open end of the cut-out portion 14 is intended to maintain a proper flatness of the tray, and is located at such a position that it will not contact the disc 1 during rotation thereof, nor will it contact the optical pick-up 20 when the signal-recorded portion at the outermost periphery of the disc 1 is to be reproduced.

Figure 7:
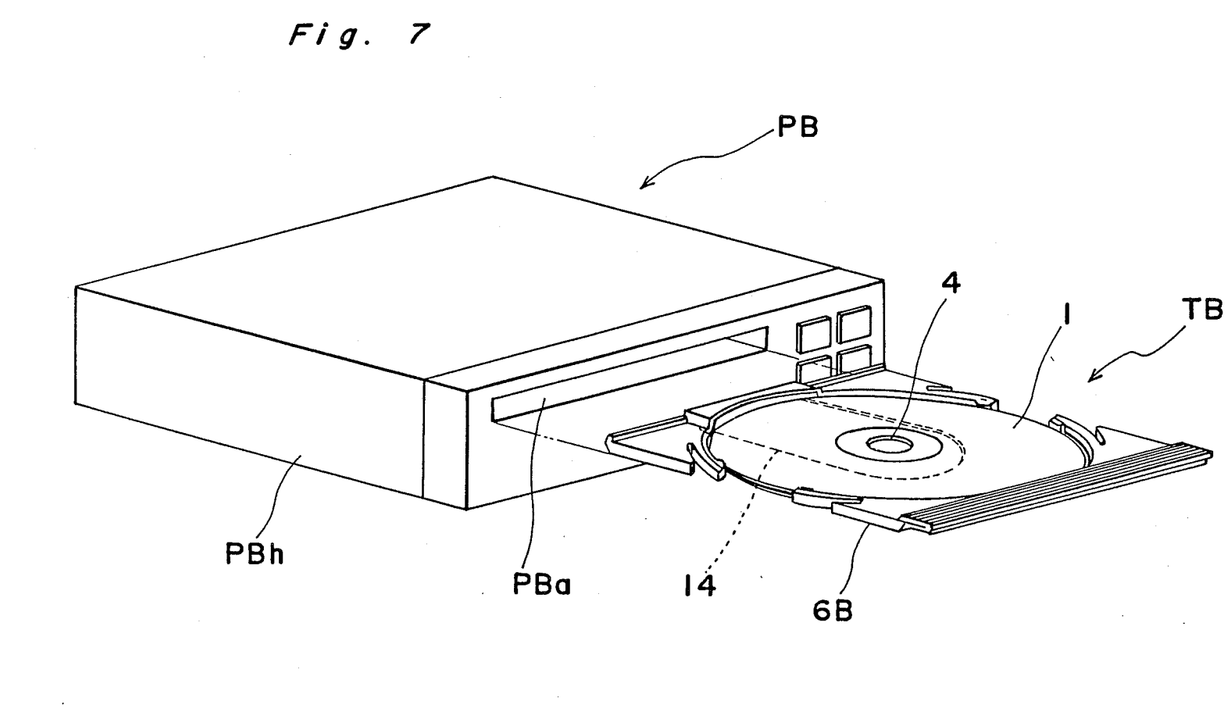
FIG. 7 is a perspective view which shows a state of use of the modified tray of FIG. 4 together with a disc player.

In FIG. 7 showing a state of actual use of the accommodation tray TB of FIGS. 4 to 6, when the tray TB in which the disc 1 has been accommodated is inserted through the insertion port PBa into the housing PBh of the disc player PB, the disc 1 is subjected to reproduction by the functions as described with reference to FIGS. 5 and 6.

It should be noted here that the accommodation trays TA and TB as described so far are particularly suitable for a disc player to be mounted on motor vehicles. The disc may be immediately inserted into the disc player during driving of the motor vehicle, as it is accommodated in the tray, without directly touching the disc with ones fingers. Upon completion of the reproduction, it can be taken out of the disc player while still accommodated in the tray. Thus, the disc is sufficiently protected against possible damages or soiling by fingers, etc. However, it is needless to say that the present invention is not limited in its application to the disc players to be carried by motor vehicles alone, but may widely be applied to home-use disc players, computers, business use apparatuses, etc. as well.

Figure 8:
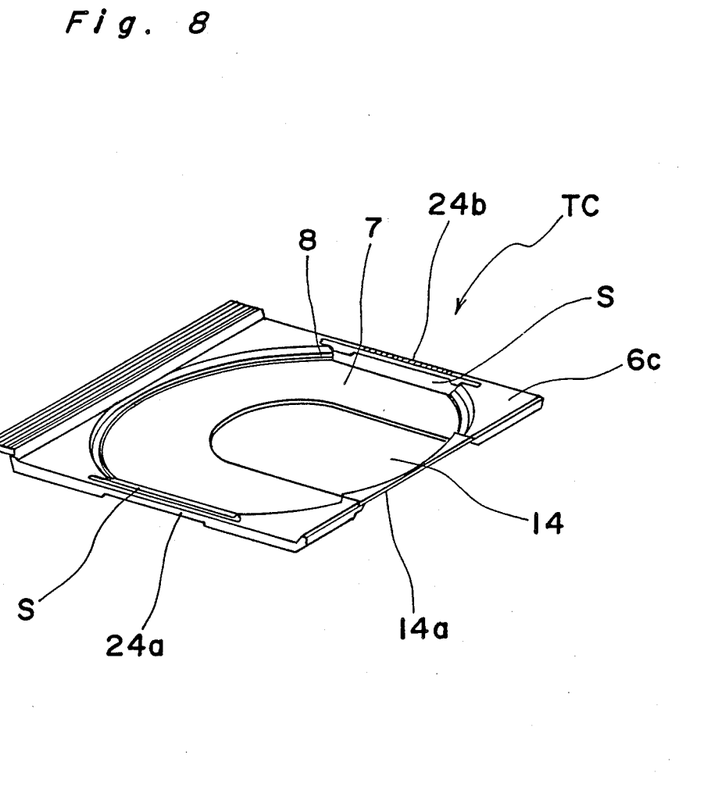
FIG. 8 is a perspective view showing a disc accommodation tray according to another embodiment of the present invention.

Referring to FIG. 8, there is shown another modification of the accommodation tray TB of FIGS. 4 to 7. In the modified accommodation tray TC in FIG. 8, the engaging portions 9 and 10, and 11 and 12 described as provided in the tray TB are replaced by disc engaging portions 24a and 24b symmetrically provided in the diametrical direction of the disc 1 and arranged to clamp the disc in the direction of its thickness.

More specifically, in the main body 6C of the tray TC at portions of the recess 7 adjacent to the respective engaging portions 24a and 24b, there are elongated openings or slots S so as to attach or detach the disc 1 by allowing the engaging portions 24a and 24b at said slots S to deflect during mounting or dismounting of the disc 1. Although there might be some difficulty in the structure of the tray TC in FIG. 8 for simply attaching or detaching the disc 1 by fingers, such a structure is still effective for an acommodation tray mainly intended to mechanically mount or dismount the disc within the disc player. Since other constructions and functions of the tray TC are generally similar to those of the tray TB in FIGS. 4 to 7, detailed description thereof is abbreviated here for brevity.

It should be noted here that in the foregoing embodiment and modifications, although the disc engaging portions are described as provided in pairs, in positions symmetrical to each other with respect to the diametrical direction of the disc, such engaging portions are not limited, in configuration and number, to the above, but may be, for example, one in number so long as the disc can be effectively retained thereby.

As is clear from the foregoing description, according to the present invention, since the disc accommodation tray is provided with engaging portions adapted to elastically clamp the disc in the diametrical direction, and a hole or opening through which the turntable can be inserted, the accommodation tray may be moutned on the disc player, with the disc accommodated in said tray, for reproduction in a state in which the disc is separated from the accommodation tray. After completion of the reproduction, the tray may be taken out from the disc player, with the disc accommodated therein as in the original state, and thus, a disc accommodation tray highly efficient in operability and a disc player employing such an accommodation tray have been advantageously presented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A disc accommodation tray for accommodating a disc, said tray comprising:
    a substantially flat one piece main body having a central recess in a surface thereof in which the disc accommodated by the tray is inserted; and
    at least one resilient engaging portion integral with and extending from said main body toward the center of said recess for maintaining the disc within the recess when it is inserted in said recess, said at least one engaging portion being resiliently displaceable in a plane extending substantially parallel to said surface,
    whereby when the disc is inserted into said recess, the disc displaces each of said at least one resilient engaging portion in said plane in a direction away from said recess.

2. A disc accommodation tray as claimed in claim 1, wherein said main body has an opening therethrough at a central portion of said recess.

3. A disc player comprising:
    a housing, said housing having an insertion port at one side thereof;
    a disc accommodation tray for accommodating a disc, said tray being insertable through said insertion port into said housing,
    said tray comprising a substantially flat one piece main body having a central recess in a surface thereof in which the disc accommodated by the tray is inserted, and at least one resilient engaging portion integral with and extending from said main body toward the center of said recess for maintaining the disc within the recess when it is inserted in said recess, said at least one engaging portion being resiliently displacable in a plane extending substantially parallel to said surface,
    whereby when the disc is inserted into said recess, the disc displaces each of said at least one resilient engagement portions in said plane in a direction away from said recess;
    a rotatable turntable in said housing adjacent said opening in said accommodation tray when the tray is inserted through said insertion port into said housing, said turn table being movable in a direction toward and away from said opening for moving through said opening when said accommodation tray accommodating a disc is inserted into said housing to raise the disc out of said central recess, and said turntable having drive means for rotating said rotatable turntable to rotate said disc after said turntable raises the disc out of said recess; and
    a pick-up head in said housing for picking up recorded information on the disc when the disc is rotated by said turntable.

4. A disc accommodation tray for accommodating a disc, said tray comprising:
- a substantially flat one piece main body having a central recess in a surface thereof in which the disc accommodated by the tray is inserted, said main body having a slot therethrough extending between a substantial portion of said recess and a portion along the periphery of said recess; and
- at least one resilient engaging portion integral with and extending from said main body for maintaining the disc within the recess when it is inserted in said recess, said at least one engaging portion being resiliently displacable in a plane extending substantially parallel to said surface,
- whereby when the disc is inserted into said recess, the disc displaces said at least one resilient engagement portions in said plane in a direction away from said recess.

5. A disc player comprising:
- a housing, said housing having an insertion port at one side thereof;
- a disc accommodation tray for accommodating a disc, said tray being insertable through said insertion port into said housing,
- said tray comprising a substantially flat one piece main body having a centeral recess in a surface thereof in which the disc accommodated by the tray is inserted, said main body having a slot therethrough extending between a central portion of said recess and a portion of the periphery of said recess, and at least one resilient engaging portion integral with and extending from said main body for maintaining the disc within the recess when it is inserted in said recess said at least one engaging portion being resiliently displacable in a plane extending substantially parallel to said surface,
- whereby when the disc is inserted into said recess, the disc displaces each of said at least one resilient engagement portions in said plane in a direction away from said recess;
- a rotatable turntable in said housing adjacent said slot at said central portion of said recess when the tray is inserted through said insertion port into said housing, said turntable being movable in a direction toward and away from said slot for moving through said slot when said accommodation tray accommodating a disc is inserted into said housing to raise the disc out of said central recess, and said turntable having drive means for rotating said turntable to rotate said disc after said turntable raises said disc out of said recess; and
- a pick-up head in said housing for picking up recorded information on the disc when the disc is rotated by said turntable.

6. A disc accommodation tray as claimed in claim 5, and further comprising means for locating said pick-up head in positions alongside said slot at which said pick-up head picks up the recorded information on the disc.

7. A disc accommodation tray for accommodating a disc, said tray comprising:
- a substantially flat one piece main body having a central recess in a surface thereof in which the disc accommodated by the tray is inserted; and
- at least one resilient engaging portion integral with an extending from said main body toward the center of said recess for maintaining the disc within the recess when it is inserted in said recess, said at least one engaging portion being resiliently displacable in a plane extending substantially parallel to said surface, and said at least one engaging portion having a disc engaging surface inclined downward and toward the center of said recess.
- whereby when the disc is inserted into said recess, the disc contacts said disc engaging surface of said at least one resilient engaging portion to displace said resilient engaging portion said plane in a direction away from said recess.

* * * * *